United States Patent
Villano et al.

(10) Patent No.: US 10,614,005 B1
(45) Date of Patent: Apr. 7, 2020

(54) EMBEDDED CONTROLLERS WITH MODULAR ARCHITECTURE

(71) Applicant: Hamilton Sundstrand Corporation, Charlotte, NC (US)

(72) Inventors: William E. Villano, Canton, CT (US); Dean Anthony Rametta, Glastonbury, CT (US); Kirk A. Lillestolen, East Hartland, CT (US); Richard A. Poisson, Avon, CT (US); Kanwalpreet Reen, Ellington, CT (US); Rachel Welsh, North Granby, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/198,268

(22) Filed: Nov. 21, 2018

(51) Int. Cl.
*G06F 13/20* (2006.01)

(52) U.S. Cl.
CPC .......... *G06F 13/20* (2013.01); *G06F 2213/40* (2013.01)

(58) Field of Classification Search
None
See application file for complete search history.

(56) References Cited

U.S. PATENT DOCUMENTS

| | | | |
|---|---|---|---|
| 6,098,140 A * | 8/2000 | Pecone | G06F 9/4411 710/301 |
| 6,298,289 B1 | 10/2001 | Lloyd et al. | |
| 6,397,759 B1 * | 6/2002 | Hubert | B61C 5/00 105/140 |
| 6,498,731 B1 * | 12/2002 | Roscoe | H05K 7/1408 361/741 |
| 6,621,709 B1 * | 9/2003 | Schnabel | G06F 1/184 361/679.01 |
| 7,259,953 B2 | 8/2007 | Salerno | |
| 7,535,730 B2 * | 5/2009 | Junkins | H05K 7/1418 29/832 |
| 9,036,351 B2 * | 5/2015 | Facusse | H05K 7/20809 165/104.33 |
| 2005/0027826 A1 * | 2/2005 | Loda | G06Q 10/06 709/219 |
| 2014/0244078 A1 | 8/2014 | Downey et al. | |
| 2016/0236770 A1 | 8/2016 | Desantis et al. | |
| 2017/0250690 A1 * | 8/2017 | Auer | H03K 19/17764 |
| 2018/0048713 A1 | 2/2018 | Brine | |
| 2019/0095377 A1 * | 3/2019 | Brown | G06F 13/4213 |

* cited by examiner

*Primary Examiner* — Elias Mamo
(74) *Attorney, Agent, or Firm* — Cantor Colburn LLP

(57) ABSTRACT

A modular embedded controller includes an enclosure with an external interface, a generic motherboard, and an external device-specific input/output daughterboard. The generic motherboard has a supervisory processor and a plurality of daughterboard seats and is supported in the enclosure. The external device-specific input/output daughterboard is supported in one of the daughterboard seats, connects the external interface to the motherboard supervisory processor, and has an input/output processor translate data communicated between the motherboard supervisory processor and a device connected to the external interface. Embedded engine controllers and gas turbine engines with embedded controllers are also described.

17 Claims, 4 Drawing Sheets

EMBEDDED CONTROLLERS WITH MODULAR ARCHITECTURE

BACKGROUND

The present disclosure relates to controllers, and more particularly to embedded controllers with modular architectures such as in critical safety equipment.

Controllers are commonly used on vehicles, such as aircraft, to control the functionality of devices carried by the vehicles. Such controllers generally include electronics located within a housing which communicate with the controlled device to operate the device. In the case of embedded controllers, such as embedded controllers commonly used to control safety critical equipment, the controller is typically a 'point design' developed for a specific application. Such point design controllers allow the controller to provide the functionality required for the application while accommodating the various constraints of the application, e.g., shape and dimensions as well the connectivity requirements of the application.

One consequence of the point design approach to embedded controllers is that control systems for different devices lack a common architecture due to the customized layout and components required for the various controllers, complicating maintenance. Further, such controllers can also add to the challenges of re-design and obsolescence management because, when multiple application-specific embedded controllers utilize a common component, and the common component becomes obsolete, each controller must be individually redesigned to incorporate the replacement component and the controller requalified with the replacement component.

Such conventional point design controllers have generally been considered satisfactory for their intended purpose. However, there is a need in the art for improved embedded controllers. The present disclosure provides a solution for this need.

BRIEF SUMMARY

A modular embedded controller includes an enclosure with an external device interface, a generic motherboard, and an external device-specific input/output (I/O) daughterboard. The generic motherboard has a supervisory processor, two or more daughterboard seats, and is supported within the enclosure. The external device-specific I/O daughterboard is supported in one of the daughterboard seats and connects the external device interface to the motherboard supervisory processor. The external device-specific I/O daughterboard includes an I/O processor to translate data communicated between the motherboard supervisory processor and an external device connected to the external interface.

In certain embodiments a digital device can be connected to the I/O module through the external interface. An analog device can be connected to the I/O module through the external device interface. The external device interface can be a first external device interface and the enclosure can include a second external device interface. The I/O daughterboard can be a first I/O daughterboard and the embedded controller can include one or more second I/O daughterboard. The second I/O daughterboard can be seated in one of the plurality of daughterboard seats. The second I/O daughterboard can connect the second external interface to the motherboard supervisory processor. The motherboard supervisory processor can include, for example, a field programmable gate array device having non-volatile flash memory or programmable logic device.

In accordance with certain embodiments, a power supply daughterboard can be seated in one of the plurality of daughterboard seats. The power supply daughterboard can connect the second external interface to the motherboard. A prognostic health monitoring (PHM) daughterboard can be seated in one of the plurality of daughterboard seats. The PHM daughterboard can connect the second external interface to the motherboard. A communication daughterboard can be seated in one of the plurality of daughterboard seats. The communication daughterboard can connect the second external interface to the motherboard.

It is contemplated that the embedded controller can include a data switch. The data switch can be supported on the motherboard and disposed in communication with the motherboard supervisory processor. The power supply daughterboard or the prognostic health monitoring daughterboard can be disposed in communication with the data switch. A control processor can be supported by the motherboard and disposed in communication with the data switch. The motherboard can be a first motherboard and the embedded controller can include a second motherboard. A supervisory processor of the second motherboard can be connected to the supervisory processor of the first motherboard by the data switch.

It is also contemplated that, in accordance with certain embodiments, the embedded controller can include an interface board. The interface board can be arranged within the interior of the enclosure. The interface board can connect the external connector to the I/O daughterboard. The interface board can include one or more of a lightening protection feature, an electrostatic discharge feature, and an electromagnetic interference shielding feature. The external connector can be a first external connector and the enclosure can have one or more second external connector connected to the motherboard by the I/O daughterboard.

A controller arrangement includes a safety critical device and an embedded controller as described above. The enclosure has a form factor peculiar to the safety critical device. The motherboard and the I/O daughterboard conform the embedded controller to the form factor of the enclosure. In certain embodiments the embedded controller can be a full authority digital electronic controller (FADEC) for a gas turbine engine.

A gas turbine engine arrangement includes an embedded controller as described above and a gas turbine engine. The gas turbine engine operatively associated with the embedded controller and the embedded controller is configured to control operation of the gas turbine engine at least in part using data communicated through the external connector.

Technical effects of embodiments of the present disclosure include customization of embedded controller electronics through the use of generic components, simplifying maintenance and reducing the burden otherwise presented by obsolescence management.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

Figure 1:
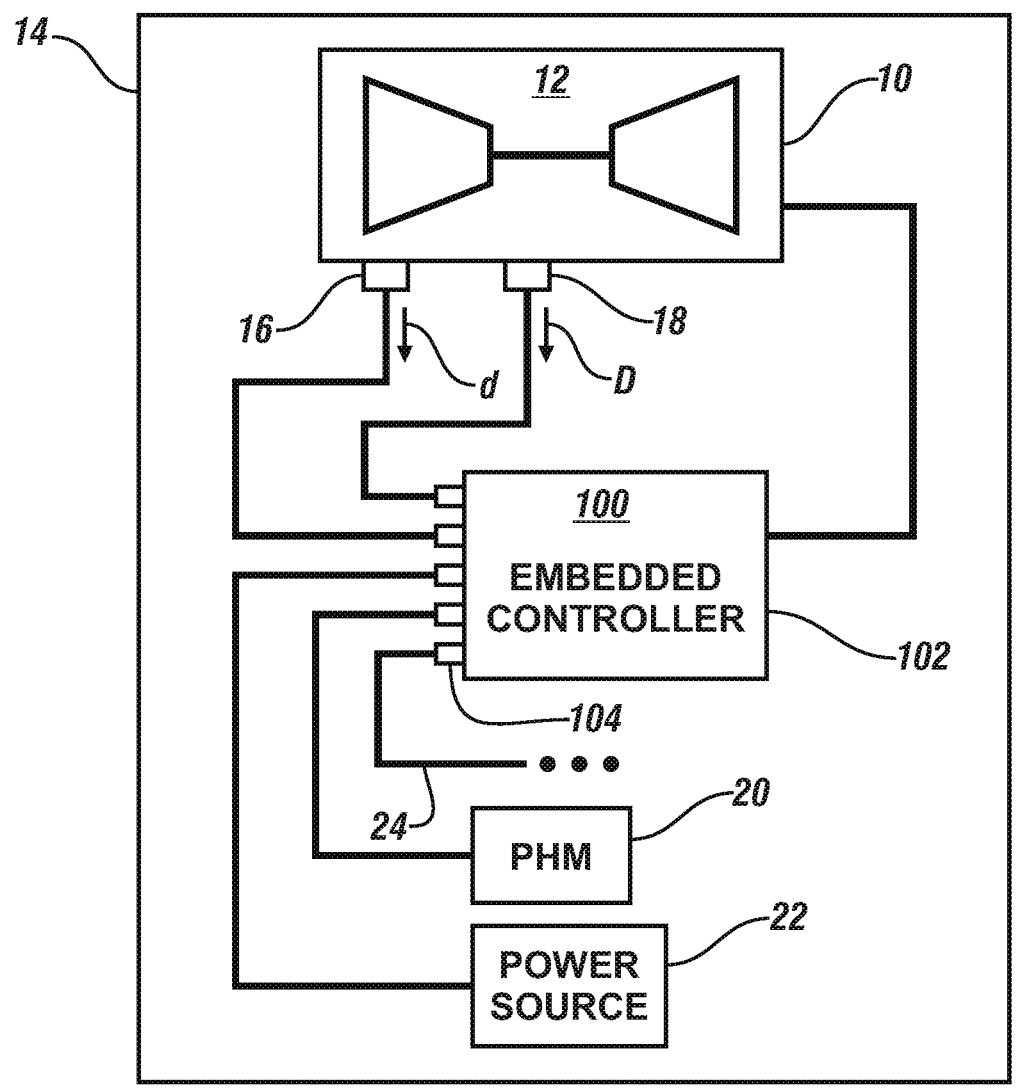
FIG. 1 is a schematic view of an exemplary embodiment of a controller constructed in accordance with the present disclosure, showing an embedded controller having a generic motherboard and daughterboards arranged within the controller enclosure.
Figure 4:
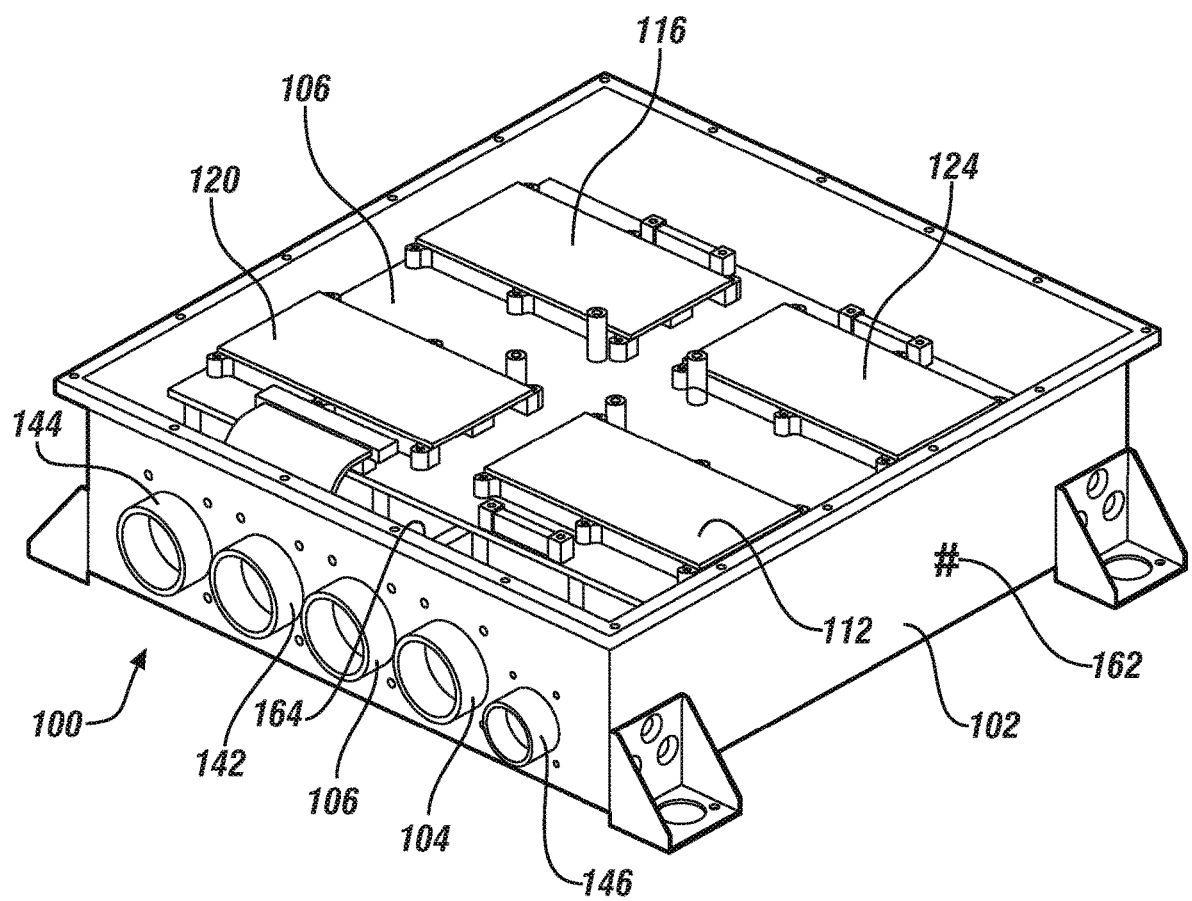
Figure 5:
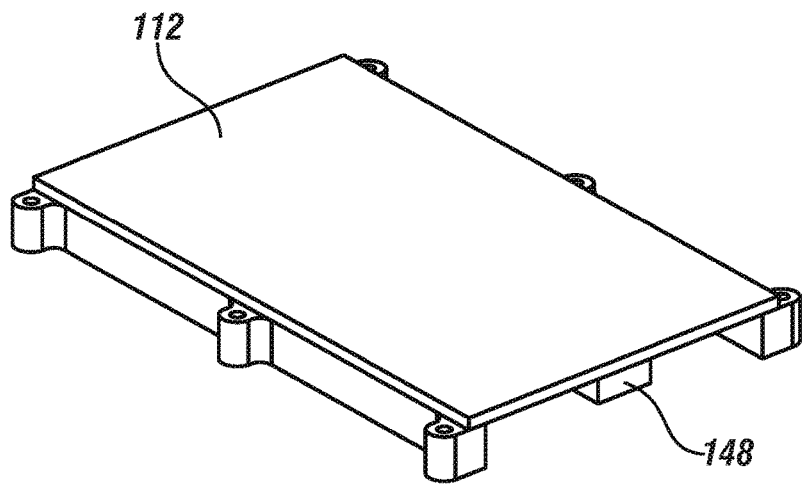

FIG. 4 is a perspective view of the controller of FIG. 1 with the enclosure cover removed according to an embodiment, showing two motherboards in a stacked arrangement and seating eight daughterboards to accommodate the form factor of the controller application; and FIG. 5 is a perspective view of the daughterboard of FIG. 1 according to an embodiment, showing the daughterboard mounting and interface structures.

DETAILED DESCRIPTION

Reference will now be made to the drawings wherein like reference numerals identify similar structural features or aspects of the subject disclosure. For purposes of explanation and illustration, and not limitation, a partial view of an exemplary embodiment of a modular embedded controller in accordance with the disclosure is shown in FIG. 1 and is designated generally by reference character 100. Other embodiments of modular embedded controllers, controller arrangements, and gas turbine engine arrangements in accordance with the disclosure, or aspects thereof, are provided in FIGS. 2-5, as will be described. The systems and methods described herein can be used to control safety critical equipment, such as full authorization digital electronic controller (FADEC) devices on aircraft, though the present disclosure is not limited to FADEC devices or to safety critical controllers on aircraft in general.

Referring to FIG. 1, modular embedded controller 100 is shown. Modular embedded controller 100 includes an enclosure 102 with an external interface 104, a generic motherboard 106 (shown in FIG. 2) with a supervisory processor 108 (shown in FIG. 2) and plurality of daughterboard seats, e.g., daughterboard seat 126 (shown in FIG. 2), and an external device-specific input/output (I/O) daughterboard, e.g. I/O daughterboard 126 (shown in FIG. 2). The generic motherboard 106 is supported within the enclosure 102. The I/O daughterboard 112 is supported in the I/O daughterboard seat 110 and connects the external interface 104 with the motherboard supervisory processor 108. The I/O daughterboard 112 has an I/O processor 156 (shown in FIG. 3) to translate data D communicated between the motherboard supervisory processor 108 and a device 10 connected to the external interface 104. The motherboard supervisory processor 108 and/or the daughterboard I/O processor 156 can include a field programmable gate array (FPGA) device, a programmable logic device (PLD), an application-specific integrated circuit (ASIC), or a general purpose processor, as suitable for an intended application.

It is contemplated that device 10 be safety critical device. For example, device 10 can include a gas turbine engine 12 carried by an aircraft 14 and the embedded controller 100 is a full authorization digital electronic controller (FADEC) device configured and adapted to for controlling the gas turbine engine 12. Further, the embedded controller 100 can have a plurality of external interfaces 104 disposed in communication with one or more analog device 16 configured to communicate using analog data d, one or more digital device 18 configured to communicate using digital data D, a prognostic and health monitoring (PHM) device 20, and a power source 22 through respective I/O daughterboards, as will be described. Further, the embedded controller 100 can be disposed in communication with a communications link 24, which can connect the embedded controller 100 with a user interface located on flight deck of the aircraft 14. As used herein the term "generic" motherboard means that the generic motherboard 106 can be used in two or more controllers having different form factors, i.e., that the generic motherboard 106 can be employed in a common circuit building block while supporting more than one controller physical outline. As will be appreciated by those of skill in the art in view of the present disclosure, this can reduce the impact of redesign for new applications and/or simplify obsolescence management across multiple platform employing the generic motherboard 106.

Figure 2:
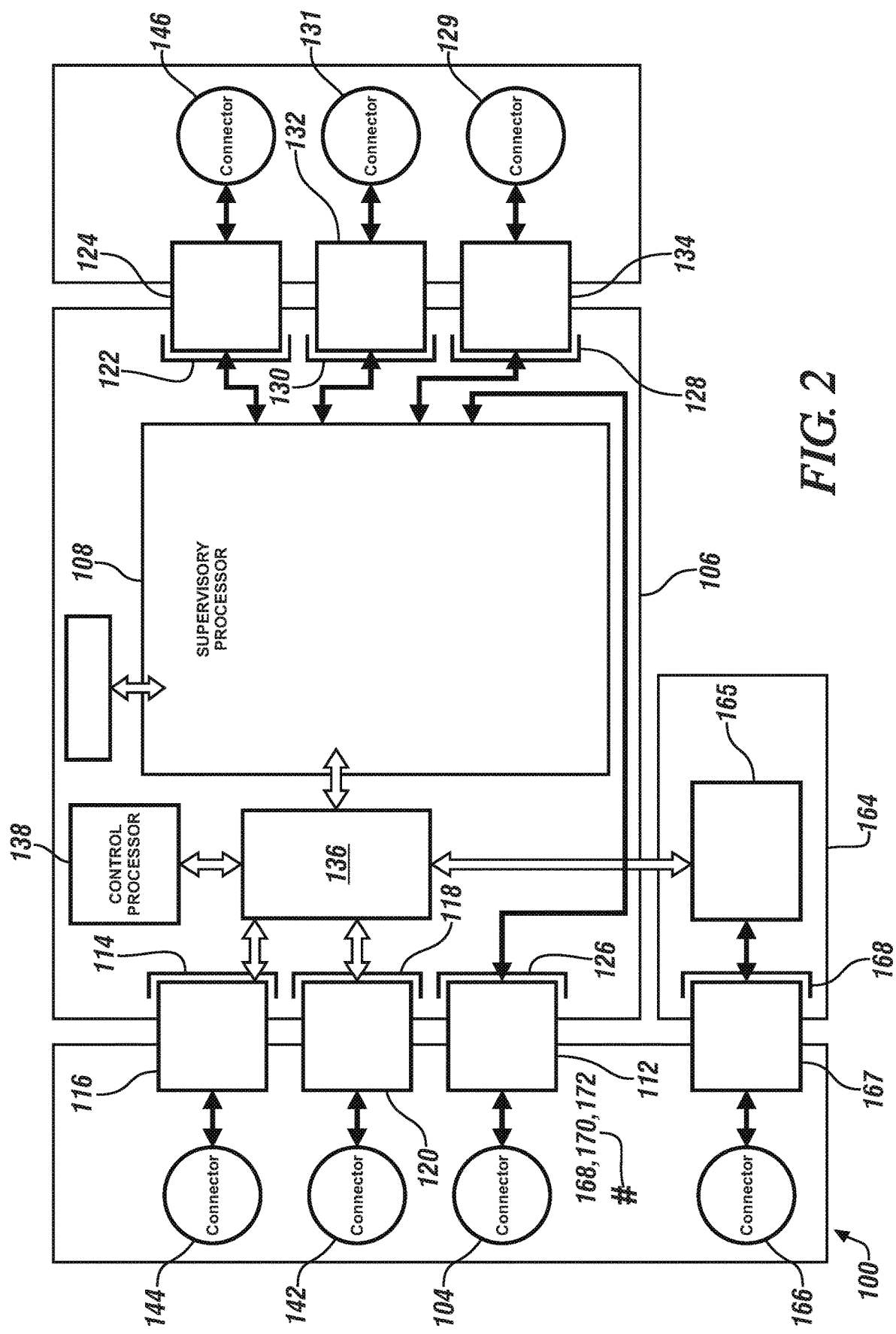
FIG. 2 is a block diagram of the generic motherboard illustrated in FIG. 1, showing the motherboard and daughterboards connected to interface boards according to an embodiment.

With reference to FIG. 2, the embedded controller 100 is shown. In the embodiment shown the embedded controller 100 includes six (6) daughterboard seats mounting three (3) I/O daughterboards, a power supply module, a PHM module, and a communications module. In this respect a first daughterboard seat 114 seats a power supply daughterboard 116, a second daughterboard seat 118 seats a PHM daughterboard 120, a third daughterboard seat 122 seats a communication daughterboard 124, and I/O daughterboard seats 126-130 each seat a respective I/O daughterboard 112/132/134. As shown in FIG. 2 the generic motherboard 106 also includes motherboard supervisory processor 108, a data switch 136, a control processor 138, and a non-volatile flash memory module 140. In certain embodiments the data switch is a multicast data switch, such as a PCIe data switch by way of non-limiting example. In accordance with certain embodiment the data switch 136 can be implemented with circuitry within the motherboard.

It is contemplated that the processing functions be divided between the motherboard supervisory processor 108 the motherboard control processor 138. For example, in certain embodiments the motherboard supervisory processor 108 coordinate, pack, and unpack data between transferred between the I/O daughterboards and the control processor 138, and the control processor 138 attend to operational activities associated with the control of the device within which the embedded controller is attached. For example, control processor 138 may make decisions regarding fuel flow change to a gas turbine engine while supervisory processor 108 package the data for communication to the gas turbine engine. It is also contemplated that the I/O processor 156 (shown in FIG. 3) convert the command into a signal suitable for the commanded device, such as to a voltage setting, etc., as suitable for an intended application.

Data switch 136 is disposed in communication with the supervisory processor 108, the control processor 138, the power supply daughterboard 116, and the PHM daughterboard 120. The PHM daughterboard 120 is connected to a PHM external interface 142 located on the enclosure 102 (shown in FIG. 1), and therethrough places the supervisory processor 108 in data communication with the PHM device 20 (shown in FIG. 1). The power supply daughterboard 116 is connected to a power supply external interface 144 located on (e.g., externally accessible) the enclosure 102, and therethrough places powered components on the generic motherboard 106 in electrical communication with the power source 22 (shown in FIG. 1). The communications daughterboard 124 is connected to a communications external interface 146 located on the enclosure 102 and therethrough connects the supervisory processor 108 with the communications link 24 (shown in FIG. 1), which may be a CAN bus.

The I/O daughterboard 112 is seated in daughterboard seat 126, is connected to the external interface 104, and connects therethrough an external device to the supervisory processor 108. It is contemplated that the external device the I/O daughterboard 112 connects to the supervisory processor 108 can be an analog device, e.g., analog device 16 (shown in FIG. 1), or a digital device, e.g., the digital device 18 (shown in FIG. 1). I/O daughterboard 132 and I/O daughterboard 134 are similar to the I/O daughterboard 112 with the difference that the difference that each are seated in separate daughterboard seats 128/130 and are connected to separate external interfaces 129/131. Notably, the particular set of daughterboards selected for the embedded controller 100 provide customization of the embedded controller 100 its application by abstracting the communication protocol routed through a given interface from the generic motherboard 106—the generic motherboard 106 thereby being usable in multiple applications due to the I/O daughterboards being able to bridge difference types of external connections (which are application specific) with the application-agnostic generic motherboard 106.

Figure 3:
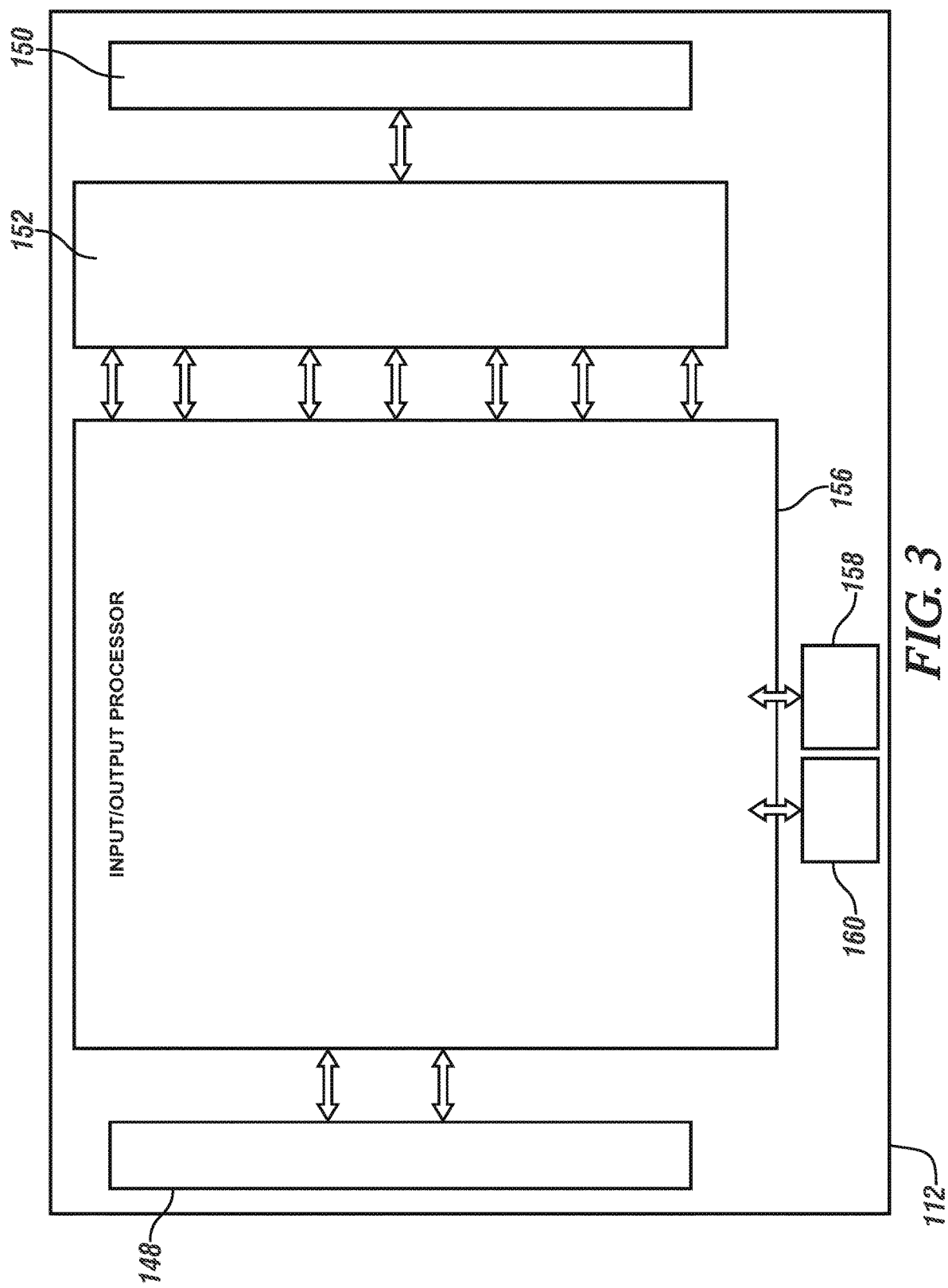
FIG. 3 is a block diagram of the motherboard illustrated in FIG. 1., showing an input/output processor seated on the daughterboard for routing data between the generic motherboard and device connected to the controller.

With reference to FIG. 3, the I/O daughterboard 112 is shown. The I/O daughterboard 112 includes an internal socket 148, and external socket 150, and an I/O interface 152. The external socket 154, which can be a ribbon-type connector, connects the external interface 104 (shown in FIG. 1) to the I/O interface 152. The I/O interface 152 connects to the internal socket 148 through a daughterboard I/O processor 156. The daughterboard I/O processor 156 is configured to convert communication between a form suitable for the generic motherboard 106 (shown in FIG. 2) to that suitable for the external device connected to I/O daughterboard 112, e.g., into digital data D (shown in FIG. 1) or analog data d (shown in FIG. 1), as suitable for the application. This provides abstraction between the generic motherboard 106 and the device connected to the generic motherboard 106 through the I/O daughterboard 112.

In the illustrated embodiment the I/O daughterboard 112 includes a non-volatile memory 158 connected to the daughterboard I/O processor 156 through which the daughterboard configuration can be programmed and retained. It is also contemplated that a daughterboard fault memory 160 can be connected to the daughterboard I/O processor 156, while allows field data to remain with the I/O daughterboard 112 to facilitate fault tracing and resolution in the event required during operation.

The I/O processor 156 provides a standardized hardware interface with logical/functional grouping of building blocks that can be configured to support various embedded control requirements. The functionality of the I/O processor 156 can be configured via local memory or via commands communicated over a link, e.g., via a serial connector. Further, the I/O processor 156 can be configured to support a built-in serial link repeater, which allows for connection to I/O processor 156 special purpose serial elements—allowing for further customization of the embedded controller 100. Notably, the I/O processor 156 provides the I/O daughterboard 112 with flexible (i.e. singular hardware arrangement configurable with software) internal data paths and the capability to support multiple data communication protocols. In certain embodiments I/O processor 156 includes a FPGA device with non-volatile flash memory 158. In accordance with certain embodiments PLD 156 can be implemented with a programmable logic device, an ASIC or processor, embodiments employing ASIC devices having the advantage that relatively little software is required for communication through the I/O daughterboard 112, embodiments having processors relying relatively heavily on software but having a comparatively simple processing environment.

With continuing reference to FIG. 2, the embedded controller 100 includes an interface board 166. The interface board 166 connects the external interfaces, e.g., the external interface 104, with the daughterboards, e.g., the I/O daughterboard 112, seated in the daughterboard slots of the generic motherboard 106. Being a separate board, the interface boards provides a platform for specialized circuitry peculiar to the intended application of the embedded controller 100. This allows the embedded controller 100 to include additional circuitry while employing the generic motherboard 106 and daughterboards selected from a group of having circuitry for the functions described above. In certain embodiments the interface board 166 includes one or more of a lightning protection feature 168, an electrostatic discharge feature 170, and an electromagnetic interference shielding feature 172. As will be appreciated by those of skill in the art in view of the present disclosure, placing these features on the interface board 166 allows for customization of the embedded controller 100 (with respect to these features) while employing generic circuit elements capable of use across multiple platforms.

Referring to FIGS. 4 and 5, the embedded controller 100 is shown according to an embodiment. Enclosure 102 has a form factor 162, which includes the dimensions (e.g., height and width) into which the generic motherboard 106 and seated daughterboards must conform and the external interfaces through which the generic motherboard 106 must communicate. The generic motherboard 106 and seated daughterboards fix within the shape and volume prescribed by the form factor 162 of the enclosure 102 while the selection of daughterboards for the embedded controller 100 provide the combination of connections necessary the application of embedded controller 100.

It is contemplated that the embedded controller 100 can include more than one motherboard. In this respect the generic motherboard 106 can be a first motherboard and the embedded controller 100 can include one or more second generic motherboard 164 (or expansion generic motherboard). The second generic motherboard 164 communicates with the first motherboard generic through the data switch 136 (shown in FIG. 2), data traveling through a connection therebetween and within the interior of the enclosure 102. The second generic motherboard 164 is similar to the first generic motherboard 106, includes a supervisory processor 165 (shown in FIG. 2), and provides one or more daughterboard seat 168 (shown in FIG. 2) for seating a daughterboard 167 (shown in FIG. 4), such as an additional I/O daughterboard.

As shown in FIG. 4, the second generic motherboard 164 can be stacked with the first generic motherboard 106 when the form factor 162 provides space for stacking. Alternatively, as shown in FIG. 2, the second generic motherboard 164 can be co-planar with the first generic motherboard 106, such as when form factor 162 allows for a relatively wide in-plane arrangement of the first generic motherboard 106 and the second generic motherboard 164. Notably, as will be appreciated by those of skill in the art, the inclusion of the second generic motherboard 164 adds additional daughterboard seats, e.g., daughterboard seat 168, for allowing additional daughterboards to be included in the embedded controller 100 beyond that otherwise supported by the first generic motherboard 106.

Referring to FIG. 5, the I/O daughterboard 112 is shown. In the illustrated embodiment the I/O daughterboard 112 includes the internal socket 148, which connects the I/O daughterboard 112 to the generic motherboard 106 for communication with the external interface 166. As will be appreciated by those of skill in the art in view of the present disclosure, the I/O daughterboard 112 can also span the generic motherboard 106 and the external interface 166, as suitable for the form factor of the intended application.

The methods and systems of the present disclosure, as described above and shown in the drawings, provide for embedded controllers with superior properties including the capability to support different form factors and connectivity requirements generic, modular motherboard and daughterboards. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A modular embedded controller, comprising:
an enclosure with an external interface;
a generic motherboard with a supervisory processor and a plurality of daughterboard seats supported in the enclosure;
an external device-specific input/output (I/O) daughterboard supported in one of the daughterboard seats and connecting the external interface with the motherboard supervisory processor, wherein the I/O daughterboard has an I/O processor to translate data communicated between the motherboard supervisory processor and a device connected to the external interface;
wherein the external interface is a first external interface, wherein the enclosure comprises a second external interface; and
a power supply daughterboard seated in one of the plurality of daughterboard seats, the power supply daughterboard connecting the second external interface to the motherboard.

2. The embedded controller as recited in claim 1, further comprising an analog device connected to the I/O daughterboard through the external interface.

3. The embedded controller as recited in claim 1, wherein the I/O daughterboard is a first I/O daughterboard and further comprising a second I/O daughterboard seated in one of the plurality of daughterboard seats, the second I/O daughterboard connecting the second external interface to the motherboard supervisory processor.

4. The embedded controller as recited in claim 1, further comprising a digital device connected to the I/O daughterboard through the external interface.

5. The embedded controller as recited in claim 1, further comprising a prognostic health monitoring (PHM) daughterboard seated in one of the plurality of daughterboard seats, the PHM daughterboard connecting the second external interface to the motherboard.

6. The embedded controller as recited in claim 1, further comprising a communication daughterboard in one of the plurality of daughterboard seats, the communication daughterboard connecting the second external interface to the motherboard.

7. The embedded controller as recited in claim 1, wherein the motherboard supervisory processor comprises a field programmable gate array (FPGA) device or a programmable logic device (PLD), wherein the daughterboard I/O processor comprises an FPGA device or a PLD.

8. The embedded controller as recited in claim 1, further comprising a data switch supported on the motherboard and disposed in communication with the motherboard supervisory processor.

9. A modular embedded controller, comprising:
an enclosure with an external interface;
a generic motherboard with a supervisory processor and a plurality of daughterboard seats supported in the enclosure;
an external device-specific input/output (I/O) daughterboard supported in one of the daughterboard seats and connecting the external interface with the motherboard supervisory processor, wherein the I/O daughterboard has an I/O processor to translate data communicated between the motherboard supervisory processor and a device connected to the external interface;
a data switch supported on the motherboard and disposed in communication with the motherboard supervisory processor; and
a power supply daughterboard or a prognostic health monitoring daughterboard disposed in communication with the data switch.

10. The embedded controller as recited in claim 9, wherein the motherboard is a first motherboard and further comprising a second motherboard, wherein a supervisory processor of the second motherboard is connected to the supervisory processor of the first motherboard by the data switch.

11. The embedded controller as recited in claim 9, further comprising a control processor supported by the motherboard and disposed in communication with the data switch.

12. The embedded controller as recited in claim 1, wherein the supervisory processor comprises non-volatile flash memory.

13. A modular embedded controller, comprising:
an enclosure with an external interface;
a generic motherboard with a supervisory processor and a plurality of daughterboard seats supported in the enclosure;
an external device-specific input/output (I/O) daughterboard supported in one of the daughterboard seats and connecting the external interface with the motherboard supervisory processor, wherein the I/O daughterboard has an I/O processor to translate data communicated between the motherboard supervisory processor and a device connected to the external interface;
a data switch supported on the motherboard and disposed in communication with the motherboard supervisory processor; and
an interface board arranged within the enclosure interior, wherein the interface board connects the external interface to the I/O daughterboard,
wherein the interface board comprises one or more of a lightening protection feature, an electrostatic discharge feature, and an electromagnetic interference shielding feature.

14. The embedded controller as recited in claim 13, wherein the external interface is a first external interface, and wherein the enclosure has at least one second external interface connected to the motherboard by the I/O daughterboard.

15. A controller arrangement, comprising:
a safety critical device; and
an embedded controller comprising:
   an enclosure with an external interface;
   a generic motherboard with a supervisory processor and a plurality of daughterboard seats supported in the enclosure;
   an external device-specific input/output (I/O) daughterboard supported in one of the daughterboard seats and connecting the external interface with the motherboard supervisory processor, wherein the I/O daughterboard has an I/O processor to translate data communicated between the motherboard supervisory processor and a device connected to the external interface;
   wherein the external interface is a first external interface, wherein the enclosure comprises a second external interface; and
   a power supply daughterboard seated in one of the plurality of daughterboard seats, the power supply daughterboard connecting the second external interface to the motherboard,
wherein the enclosure has a form factor peculiar to the safety critical device, and wherein the motherboard and the I/O daughterboard conform the embedded controller to the form factor of the enclosure.

16. The controller arrangement as recited in claim 15, wherein the embedded controller is a full authority digital electronic controller (FADEC) for a gas turbine engine.

17. A gas turbine engine arrangement, comprising:
an embedded controller, comprising
   an enclosure with an external interface;
   a generic motherboard with a supervisory processor and a plurality of daughterboard seats supported in the enclosure;
   an external device-specific input/output (I/O) daughterboard supported in one of the daughterboard seats and connecting the external interface with the motherboard supervisory processor, wherein the I/O daughterboard has an I/O processor to translate data communicated between the motherboard supervisory processor and a device connected to the external interface;
   wherein the external interface is a first external interface, wherein the enclosure comprises a second external interface; and
a power supply daughterboard seated in one of the plurality of daughterboard seats, the power supply daughterboard connecting the second external interface to the motherboard; and
a gas turbine engine operatively associated with the embedded controller, wherein the embedded controller is configured to control operation of the gas turbine engine at least in part using data communicated through the external interface.

* * * * *